United States Patent [19]

Cahen et al.

[11] 3,926,852

[45] Dec. 16, 1975

[54] OXIDATION CATALYSTS

[75] Inventors: Raymond M. Cahen, Brussels; Henri R. Debus, Meise; Jacques M. J. G. Andre, Brussels, all of Belgium

[73] Assignee: Labofina S. A., Brussels, Belgium

[22] Filed: Oct. 26, 1973

[21] Appl. No.: 410,276

[30] Foreign Application Priority Data

May 4, 1973  Belgium ............................... 130731

[52] U.S. Cl. ................ 252/456; 252/441; 252/461; 252/464; 252/465; 260/346.4; 260/523 R; 260/533 C

[51] Int. Cl.² .......................................... B01J 29/16

[58] Field of Search ............ 252/456, 461, 464, 441

[56] References Cited
UNITED STATES PATENTS

| 2,510,803 | 6/1950 | Cooper .......................... 252/456 X |
| 2,839,535 | 6/1958 | Hadley et al. ................... 252/464 X |
| 3,226,337 | 12/1965 | Rienenschneider et al. ... 252/461 X |
| 3,351,565 | 11/1967 | Kerr ................................. 252/456 X |
| 3,576,825 | 4/1971 | Bergman ......................... 252/461 X |

FOREIGN PATENTS OR APPLICATIONS 1,010,953  11/1965  United Kingdom ................ 252/465

OTHER PUBLICATIONS

Handbook of Chemistry and Physics 44th Ed. Chemical Rubber Publ. Co., Cleveland Ohio, pp. 680–681 (1962).

*Primary Examiner*—Helen M. S. Sneed

[57] ABSTRACT

A process for producing catalysts which are used for the vapor-phase oxidation of olefinic hydrocarbons comprising impregnating a refractory carrier with a liquid oxytrihalide of vanadium selected from the group consisting of oxytrichloride and oxytribromide, removing the excess of said oxytrihalide of vanadium, hydrolyzing said oxytrihalide of vanadium and thereafter calcining the catalyst.

14 Claims, No Drawings

OXIDATION CATALYSTS

The present invention relates to a method of producing catalysts which are useful in the vapor-phase oxidation of hydrocarbons. More particularly, the present invention relates to a method of producing catalysts useful for the vapor phase oxidation of aromatic hydrocarbons and olefinic hydrocarbons, to the corresponding acid anhydrides. The present invention also relates to the catalysts prepared by this process.

The vapor-phase oxidation of hydrocarbons by molecular oxygen containing gas, more particularly by air, is a widely used process for manufacturing phthalic anhydride from o-xylene or from naphthalene, pyromellitic dianhydride from durene, maleic anhydride from benzene and acetic anhydride from butene. A catalyst made up of vanadium oxide on a carrier often is used for performing such oxidation reactions. Such catalysts frequently contain one or more promotors, such as titanium oxide, phosphoric oxide and the like. However, employing such known catalysts, the desired acid anhydride generally is in admixture with relatively large amounts of undesirable oxidation by-products. For instance, by oxidizing durene or 1,2,4,5-tetramethylbenzene, the obtained pyromellitic dianhydride or 1,2,4,5-benzenetetracarboxylic acid dianhydride contains by-products such as trimellitic acid anhydride, 4,5-dimethylphthalic acid and 4-methylphthalic acid anhydride. These by-products are formed at the expense of the yield of pyromellitic dianhydride and moreover, they make more difficult the purification of said dianhydride.

Various proposals have been made to improve the selectivity of such catalysts in these oxidations to produce primarily the anhydride. However, modifications of the operating conditions and/or the addition of additives to the catalyst have, in general, led either to a decrease of the oxidation rate of the feed or more important, to formation of combustion products. Further, yield of anhydride based on the amount of charged feed is not increased.

An object of the present invention is to provide an improved catalyst for the vapor-phase oxidation of hydrocarbons.

Another object of the present invention is to provide a new and improved catalyst for the vapor-phase oxidation of aromatic hydrocarbons and olefinic hydrocarbons to the corresponding acid anhydride with formation of a minimum of by-products.

An additional object of the present invention is to provide a method for preparing catalysts useful in the vapor-phase oxidation of hydrocarbons.

Still another object of the present invention is to provide a new and improved vanadium oxide catalyst useful in the vapor-phase oxidation of aromatic and olefinic hydrocarbons.

Further objects of the present invention will become apparent from the following description of the invention herein disclosed.

In fulfillment of these and other objects, the present invention, in one of its embodiments, is a catalyst consisting essentially of a carrier and vanadium oxide which is placed upon the carrier by hydrolysis of vanadium oxytrihalide and thereafter calcination, the halide of the oxytrihalide being selected from the group consisting in chlorine and bromine. In another embodiment, the present invention is a process for manufacturing a vanadium oxide catalyst comprising impregnating a refractory carrier with a liquid oxytrihalide of vanadium, removing the excess of oxytrihalide, hydrolyzing the oxytrihalide upon the carrier and thereafter calcining the catalyst, the halide of the oxytrihalide being selected from the group consisting of chlorine and bromine.

The carrier employed in the catalyst of the present invention may be in any usual form, for example in the form of beads, pellets, cylinders, vermicelli and the like. Such carriers generally include those consisting of silica, alumina, mixtures of silica and alumina, silicium carbide or other such refractory material. In preparing the catalyst of the present invention, the carrier is impregnated with a liquid oxytrihalide of vanadium, the halide of the oxytrihalide being chlorine or bromine. The oxytrihalide is one prepared by reacting chlorine or bromine with vanadium oxides. Vanadium oxytrichloride preferably is used. This compound may also be prepared by reacting thionyl chloride with vanadium pentoxide, according to the reaction $V_2O_5 + 3\ SOCl_2 \rightarrow 2\ VOCl_3 + 3\ SO_2$. During impregnation of the carrier with the vanadium oxytrihalide, it is preferred to avoid the presence of moisture and, consequently, the carrier should be dried prior to impregnation.

In impregnating the carrier, in accordance with a preferred embodiment of the present invention, the carrier is immersed in liquid oxytrihalide of vanadium and the excess of oxytrihalide is thereafter removed. The immersion time depends on a number of considerations, including the nature of the carrier, the size and porosity of the carrier particles, and like considerations. Other techniques such as spraying, vapor-phase impregnation and the like also may be used, at atmospheric, super- or sub-atmospheric pressure, for impregnating the carrier with the oxytrihalide of vanadium.

Water, steam or a carrier gas, such as air, which is saturated by water, may be used for the hydrolysis step of the present invention. This hydrolysis is carried out at a temperature which may be between about 0° and 150°C, preferably between about 5° and 100°C and more particularly, between 10° and 50°C. The hydrolysis time depends on many factors such as temperature and flow rate of the hydrolyzing gas, particle size of the carrier, depth of the catalyst bed, and the like. The operation is conveniently carried out by any method which permits intimate contact between the carrier particles and the hydrolyzing agent.

The amount of vanadium oxide on the catalyst may be varied within wide limits and depends primarily on the particle size and porosity of the carrier. Catalysts with a high content of vanadium oxide may be prepared by carrying out successively, several impregnation and hydrolysis operations, with calcination after each hydrolysis or after the last hydrolysis only. It is therefore possible to prepare catalysts containing from 0.1 to 25% by weight, more particularly between 1 and 10% by weight of vanadium oxide based on the weight of the final catalyst.

The catalysts of the present invention also may contain other metallic oxides, such as titanium, tin, niobium, germanium, chromium, phosphorus oxides and the like which act as a promotor. According to the present invention, these other metallic oxides may be incorporated into the catalyst by treating the catalyst carrier with liquid oxytrihalide of vanadium containing a dissolved halide or other soluble salt of the metal, the oxide of which acts as a promotor. According to a preferred embodiment of the invention, the carrier is impregnated with liquid vanadium oxytrichloride containing dissolved chloride of titanium, tin, niobium, germanium, chromium, phosphorus or a mixture of these chlorides. After hydrolysis and calcination, there is obtained a catalyst containing vanadium oxide together with one or more promotors. The promotor may also be incorporated into the catalyst before or after formation of the vanadium oxide. For example, the catalyst carrier may be impregnated with a halide or other salt of one of the above mentioned promoting metals or by a mixture of such halides and/or salts which are then converted into the corresponding oxides. The carrier containing the promotor(s) is then treated by the vanadium oxytrichloride or vanadium oxytribromide as above described, and the product hydrolyzed and calcined.

The amount of promotors, if any, in the catalyst of the present invention depends on the physical properties of the carrier, on the amount of metal halide or metal salt which is used and on the number of treatments. Useful catalysts containing up to 25% by weight of such promotors may be prepared. However, in general, the promotor content of the catalyst will not excess 10% by weight, these percentages being based on the weight of the finished catalyst.

In order to more fully describe and to exemplify the present invention, the following examples are presented. These examples are not to be construed as in any manner limiting the present invention.

EXAMPLE 1

A catalyst carrier (400 ml) consisting essentially of silicium carbide in the form of beads with an average diameter of 4.7 mm, and containing 25 to 30% of $SiO_2$, was calcined for 1 hour at 350°C. There was obtained 372.5 g of catalyst carrier which was introduced into a Pyrex cylindrical reactor (diameter: 70 mm; high : 200 mm) having 3 apertures at the top and 1 aperture at the bottom. One of the top apertures was used to introduce vanadium oxytrichloride. One of the other top apertures was used for the removal of the exhaust gases and the other for the removal of the vapors which were formed during the hydrolysis. The bottom aperture was used to remove the excesss of $VOCl_3$ and to introduce the hydrolyzing agent. The lower part of the reactor contained in bed (depth : 20 mm) of aluminium Raschig-rings. The catalyst carrier in the reactor was swept for 30 minutes by a current of dry and pure nitrogen to remove any moisture therefrom. $VOCl_3$ was introduced in an amount (225 ml) such that the carrier was completely immersed by this liquid, at 25°C. After 15 minutes, the excess of $VOCl_3$ was withdrawn, a current of nitrogen being introduced into the top of the reactor to aid in draining the excess liquid. The $VOCl_3$ on the carrier was then hydrolyzed for 1 hour by passing thereover at 25°C of air saturated with water, the air being introduced through the bottom aperture of the reactor at a rate of 1,200 liters/hour. The catalyst was then removed from the reactor, air dried for 16 hours at 150°C and calcined for 1 hour at 500°C. The resulting catalyst contained 4.9% by weight of vanadium oxide.

Vapor-phase oxidation of durene was carried out with this catalyst and pyromellitic dianhydride was obtained with a yield of 81.6% by weight. By way of comparison, vapor-phase oxidation of durene was carried out under substantially the same conditions in the presence of a catalyst prepared from the same carrier as above but the vanadium oxide was obtained from a solution of ammonium metavanadate according to a known process (see process described in German Pat. OLS No. 1,964,620). This catalyst contained 5.3% of vanadium oxide. The yield in pyromellitic anhydride was only 49% by weight.

EXAMPLE 2

Example 1 was substantially repeated for preparing a catalyst consisting of silicium carbide and vanadium oxide and containing 6.7% by weight of vanadium oxide.

This catalyst was used for the vapor-phase oxidation of durene. The pyromellitic dianhydride yield was 82.1% by weight.

By way of comparison, a catalyst consisting of silicium carbide and 6.8% by weight of vanadium oxide prepared from vanadium oxalate (according to a known process such as that described in Canadian Pat. No. 781,453) was used for the vapor-phase oxidation of durene. The pyromellitic dianhydride yield was 55.4% by weight.

EXAMPLE 3

The process described in Example 1 for preparing the catalyst was employed in the impregnation of 100 ml of the catalyst carrier of Example 1 by a mixture of 99 ml of $VOCl_3$ and 1 ml of $TiCl_4$. The final catalyst contained 5.2% by weight of vanadium oxide and 0.1% by weight of titanium oxide. Pyromellitic dianhydride was obtained in a yield of 97% by weight of the vapor-phase oxidation of durene in the presence of this catalyst.

EXAMPLE 4

Example 1 was substantially repeated for the preparation of catalysts from 100 ml of catalyst carrier and a liquid mixture consisting of 99 ml of $VOCl_3$ and respectively, 1 ml of a chloride of Sn, P, Cr, Sb, Ge and Nb. The final catalyst contained about 5% by weight of vanadium oxide and about 0.1% by weight of an oxide of Sn, P, Cr, Sb, Ge and Nb.

EXAMPLE 5

Example 1 was substantially repeated for the preparation of a catalyst with the exception that the carrier was one consisting of 90% alumina and 10% of silica and having the form of cylinders with a diameter of 6 mm and a high of 6 mm. Also, the carrier was impregnated with the oxytribromide of vanadium at a temperature of 40°C and a pressure of 5 kg/cm², and the immersion time being 15 minutes. The catalyst contained 7.1% by weight of vanadium oxide. Acetic anhydride was selectively formed by the vapor-phase oxidation of butene in the presence of this catalyst.

EXAMPLE 6

Example 1 was repeated for the preparation of a catalyst consisting of silicium carbide and 7.1% by weight of vanadium oxide. Phthalic anhydride was obtained with a yield of 85.5% by weight by the vapor-phase oxidation of o-xylene in the presence of this catalyst.

EXAMPLE 7

Example 1 was repeated except that the catalyst carrier was first immersed in titanium chloride, the excess of titanium chloride then removed, the titanium chloride then hydrolyzed by air saturated with water at 25°C and thereafter dried during 6 h. at 150°C and during 1 h. at 500°C, prior to impregnation with the vanadium compound. The carrier containing the titanium oxide was then immersed in vanadium oxytrichloride, the excess of vanadium oxytrichloride removed, and the impregnated catalyst subjected to hydrolysis and calcination as described in Example 1. The catalyst obtained contained 5.25% by weight of vanadium oxide and 0.94% by weight of titanium oxide.

EXAMPLE 8

Example 1 was repeated with the exception that vanadium oxytribromide was used instead of vanadium oxytrichloride. The catalyst contained 4.9% by weight of vanadium oxide.

What is claimed is:

1. A process for producing catalysts which are used for the vapor-phase oxidation of olefinic hydrocarbons comprising impregnating a refractory carrier under substantially anhydrous conditions with a liquid oxytrihalide of vanadium selected from the group consisting of oxytrichloride and oxytribromide, removing the excess of said oxytrihalide of vanadium, hydrolyzing said oxytrihalide of vanadium and thereafter calcining the catalyst.

2. The process of claim 1 wherein the hydrolysis of the vanadium oxytrihalide is carried out at a temperature of between 0° and 150°C.

3. The process of claim 2 wherein the hydrolysis is carried out at a temperature of between 5° and 100°C.

4. The process of claim 1 wherein the carrier is impregnated with at least one promotor compound selected from the group consisting of the halides and soluble salts of a metal selected from the group consisting of titanium, tin, niobium, germanium, chromium and phosphorus, the halide being selected from the group consisting of chlorine and bromine, hydrolyzed and thereafter calcined, whereby the oxide of said metal is formed.

5. The process of claim 4, wherein said carrier is impregnated with said promotor compound contained in said liquid oxytrihalide.

6. The process of claim 1 wherein the carrier is subjected to several successive impregnations with said liquid oxytrihalide of vanadium.

7. The process of claim 6 wherein each impregnation is followed by hydrolysis and calcination.

8. The process of claim 6 wherein each impregnation is followed by hydrolysis but only the last hydrolysis is followed by calcination.

9. A catalyst for the vapor-phase oxidation of aromatic hydrocarbons and olefinic hydrocarbons to the corresponding acid anhydrides, consisting of a refractory carrier and 0.1 to 25% by weight of vanadium oxide prepared in situ on such carrier by impregnating said carrier with liquid oxytrihalide of vanadium under substantially anhydrous conditions, the halide being selected from the group consisting of chloride and bromine, and hydrolyzing said oxytrihalide and thereafter calcining said catalyst.

10. The catalyst of claim 9 wherein said catalyst contains 0 to 25% by weight of a metal oxide promotor selected from the group consisting of the oxide of titanium, tin, niobium, germanium, chromium and phosphorus.

11. The process of claim 1, wherein said oxytrihalide of vanadium is the oxytrichloride.

12. The catalyst of claim 9, wherein said oxytrihalide of vanadium is the oxytrichloride.

13. The process of claim 1, wherein said carrier is impregnated with a liquid consisting essentially of said oxytrihalide of vanadium.

14. The process of claim 13, wherein said liquid is pure oxytrihalide of vanadium.

* * * * *